United States Patent [19]

Boultinghouse

[11] Patent Number: 4,980,220

[45] Date of Patent: Dec. 25, 1990

[54] IRIDESCENT PLASTICS AND PROCESS FOR PRODUCING THE SAME

[75] Inventor: Harold D. Boultinghouse, Apache Junction, Ariz.

[73] Assignee: Phillips Petroleum Company, Bartlesville, Okla.

[21] Appl. No.: 148,336

[22] Filed: Jan. 25, 1988

[51] Int. Cl.[5] ........................... B32B 3/10; B32B 3/28

[52] U.S. Cl. .................................... 428/155; 428/220; 428/335; 428/336; 428/913

[58] Field of Search ............... 428/152, 155, 451, 500, 428/691, 696, 702, 30, 220, 335, 336

[56] References Cited

U.S. PATENT DOCUMENTS

| | | | |
|---|---|---|---|
| 1,845,457 | 2/1932 | Walsh | 428/155 |
| 3,356,523 | 12/1967 | Libbert | 428/696 |
| 3,400,036 | 9/1968 | Hemrick | 428/155 |
| 3,470,013 | 9/1969 | Wagner | 117/70 |
| 3,803,074 | 4/1974 | Jenkins | 260/29 |
| 3,845,180 | 10/1974 | Pinsky | 264/41 |
| 3,900,630 | 8/1975 | Makishima | 428/155 |
| 3,909,471 | 9/1975 | Ruske | 260/22 |
| 3,914,522 | 10/1975 | Saverin et al. | 428/513 |
| 4,009,295 | 2/1977 | Walker | 427/40 |
| 4,056,661 | 11/1977 | Sato et al. | 428/144 |
| 4,447,473 | 5/1984 | Mashida | 428/155 |
| 4,599,272 | 7/1982 | Ichikawa | 428/451 |

OTHER PUBLICATIONS

Technical Report by Phillips Petroleum Company—"-Vacuum Metallized Headlamp Reflectors of Ryton Polyphenylene Sulfide", file PCT-343 (Jun. 1, 1980).

*Primary Examiner*—George F. Lesmes

*Assistant Examiner*—Jenna Davis

*Attorney, Agent, or Firm*—Laney, Dougherty, Hessin & Beavers

[57] ABSTRACT

As articles of manufacture, iridescent plastics are provided. The plastics include at least one surface having a layer of material adhered thereto, the layer of material having a plurality of fractures formed therein whereby light is reflected from the fractures to impart an iridescent quality to the surface. A process for forming iridescent plastics or for imparting an iridescent quality to a plastic member is also provided.

7 Claims, 1 Drawing Sheet

IRIDESCENT PLASTICS AND PROCESS FOR PRODUCING THE SAME

BACKGROUND OF THE INVENTION

1. Field of the Invention

This invention relates generally to plastics and plastic articles of manufacture, and more particularly, but not by way of limitation, to iridescent plastics and processes for producing the same.

2. Description of the Prior Art

Today, plastics are used by every major industry. They have replaced many more expensive and less efficient natural materials. Plastics can be shaped in almost any form. They are lightweight, strong, and easy to clean.

The use of decorative or ornamental plastics is rapidly increasing. Plastics are being made to look like gold, wood, leather and many other natural materials. Decorative plastics can be used to form novelties, toys, jewelry, home furnishings and many other products.

Decorative or ornamental plastics can be made in several ways. Special coatings or surface textures can be applied to the surface of plastics. Plastics can be combined with other materials to form products having various textures, images, etc. They can be colored or made transparent.

The present invention provides novel and unusual plastics. A process for producing the novel and unusual plastics is also provided.

SUMMARY OF THE INVENTION

In one aspect, the present invention consists of a plastic article of manufacture in the form of a plastic member. The plastic member includes at least one surface having a layer of material adhered thereto, the layer of material having a plurality of fractures formed therein whereby light is reflected from the fractures to impart an iridescent quality to the surface.

In a preferred embodiment of the plastic member, the material forming the layer of material adhered to the surface(s) of the plastic member comprises at least one compound selected from the group consisting of silicon oxide (SiO) and magnesium fluoride ($MgF_2$). The plastic member is formed of a composition comprising a copolymer of a conjugated diene and a monovinyl substituted aromatic hydrocarbon.

In another aspect, the present invention consists of a process for forming iridescent plastics or for imparting an iridescent quality to a plastic member. The process includes the steps of coating at least one surface of a plastic member with a layer of material, the material being more rigid than the plastic member, and relaxing the surface(s) of the plastic member to cause a plurality of fractures to form in the layer of material whereby light is reflected from the fractures at various wavelengths to cause said surface(s) to display an array of lustrous colors.

In a preferred embodiment of the process, the material forming the layer of material coated onto the surface(s) of the plastic member comprises at least one compound selected from the group consisting of silicon oxide and magnesium fluoride. The plastic member is formed of a composition comprising a copolymer of a conjugated diene and a monovinyl substituted aromatic hydrocarbon.

The iridescent plastics and process of the present invention have application in all areas where decorative and ornamental plastics are used. The iridescent plastics can be utilized to encapsulate and package articles for sale. They can be used to form lamp shades and a large variety of other decorative articles of manufacture.

It is therefore an object of the present invention to provide novel and unusual plastics.

It is an object of the present invention to provide plastics that reflect light so as to display an array of lustrous colors.

It is also an object of the present invention to provide a novel process for forming iridescent plastics or for imparting an iridescent quality to plastics.

Numerous other objects, features and advantages of the present invention will be readily apparent to those skilled in the art upon a reading of the following disclosure, including the example provided therewith.

DESCRIPTION OF THE PREFERRED EMBODIMENTS

Figure 1:
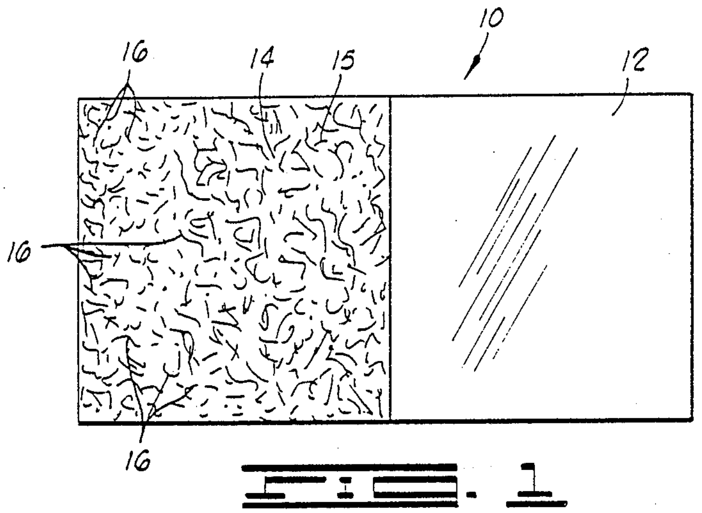
FIG. 1 is an enlarged top view of an article of manufacture of the present invention.
Figure 2:
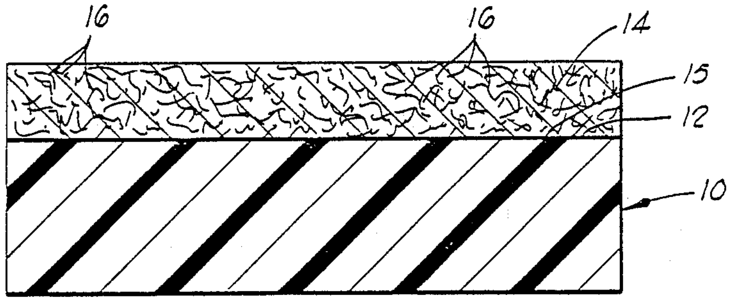
FIG. 2 is an enlarged end view of an article of manufacture of the present invention.

Referring now to the drawings, and particularly to FIGS. 1 and 2, an article of manufacture of the present invention is illustrated. The article of manufacture illustrated is a plastic member or plastic sheet 10.

The sheet 10 includes a surface 12 having a layer of material 14 adhered to a portion 15 thereof. The layer of material 14 includes a plurality of minute fractures 16 formed therein whereby light is reflected from the fractures to impart an iridescent quality to the surface 12 of the sheet 10.

As shown in FIG. 1, the layer of material 14 is adhered to only a portion of one surface of the plastic sheet 10. As will be understood by those skilled in the art, the layer of material 14 can be adhered to any portion or portions of one or more surfaces of the sheet 10. The sheet 10 can be used to form other articles of manufacture. The layer of material 14 can be coated with one or more additional layers of material. The additional layer or layers of material can serve to protect the layer of material 14. The layer of material 14 is preferably substantially transparent or clear.

The layer of material 14 can be formed of any material. It is preferably formed of a material consisting of one or more elements or compounds of the type capable of being deposited on one or more surfaces of the sheet 10 by vacuum deposition or sputtering techniques, such as the type of elements or compounds commonly used to coat binocular, telescope and/or eyeglass lenses. Even more preferably, the layer of material 14 is formed of one or more compounds selected from the group consisting of silicon oxide (SiO) and magnesium fluoride ($MgF_2$). Most preferably, the layer of material 14 consists essentially of either silicon oxide or magnesium fluoride.

Any type of plastics can be used to form the article of manufacture of the present invention. For example, polystyrene, mylar or other rigid or flexible substrates can be used. Preferably, the plastics used comprise a copolymer of a conjugated diene and a monovinyl substituted aromatic hydrocarbon. More preferably, the plastics used comprise a styrene/butadiene copolymer.

Most preferably, the plastics used comprise a resinous branched block copolymer containing about 70 to 95 weight percent polymerized styrene monomer and about 5 to 30 weight percent polymerized butadiene monomer. Suitable resinous branched block copolymers containing about 70 to 95 weight percent polymerized styrene monomer and about 5 to 30 weight percent polymerized butadiene monomer are described in U.S. Pat No. 3,639,517 to Kitchen et al. and sold by Phillips 66 Company under the trademark "K-RESIN ® POLYMERS".

The plastics used can be of any thickness. Preferably, the plastics used are from about $\frac{1}{4}$ of an inch thick to about $\frac{1}{8}$ of an inch thick. Preferably, the layer of material 14 is in the range of from about 1 micrometer to about 50 micrometers thick.

As used in this disclosure and the appendant claims, iridescent means having a rainbow effect, i.e., displaying a play of lustrous colors like those of the rainbow. The fractures formed in the layer of material reflect light to impart the iridescent quality to the surface(s) of the plastic sheet. In other words, the fractures reflect light at varying wavelengths to create the array of lustrous colors. The iridescent quality adds an ornamental and decorative effect to the plastic sheet or other articles of manufacture formed of the plastics of the present invention.

As used in this disclosure and the appendant claims, fractures means cracks, recesses, ridges, grooves, or other alterations capable of reflecting light at various wavelengths.

In another aspect, the present invention consists of a process for forming iridescent plastics or for imparting an iridescent quality to a plastic member. The process includes the steps of coating at least one surface of a plastic member with a layer of material, the material being more rigid than the plastic member, and relaxing the surface(s) of the plastic member to cause a plurality of light reflecting minute fractures to form in the layer of material. Relaxing the surface(s) of the plastic member may also cause fractures to be formed therein, which may in turn cause fractures to be formed in the layer of material.

The layer of material coated onto the surface(s) of the plastic member can be formed of any material. Preferably, it is formed of a material consisting of one or more elements or compounds of the type capable of being deposited on the surface(s) of the plastic member by vacuum deposition or sputtering techniques, such as the type of elements or compounds commonly used to coat binocular, telescope and/or eyeglass lenses. More preferably, the layer of material is formed of one or more compounds selected from the group consisting of silicon oxide (SiO) and magnesium fluoride ($MgF_2$). Most preferably, the layer of material 14 consists essentially of either silicon oxide or magnesium fluoride.

The surface(s) of the plastic member can be coated with the layer of material by any means. Preferably, the surface or surfaces of the plastic member are coated with the layer of material by a standard vacuum deposition technique, i.e., by evaporating the material and condensing it thereon. Alternatively, the plastic member can be coated with the layer of material by standard sputtering techniques. Inasmuch as standard vacuum deposition and sputtering techniques are generally known in the art, a detailed description of the techniques is not provided herein. Additional layers or protective coatings can be applied to the layer of material if desired.

Any type of plastics can be used in the process. Preferably, the plastics used in the process are formed of a composition comprising a copolymer of a conjugated diene and a monovinyl substituted aromatic hydrocarbon. More preferably, the plastics used in the process are formed of a composition comprising a styrene/-butadiene copolymer.

Most preferably, the plastics used in the process are formed of a resinous branched block copolymer containing about 70 to 95 weight percent polymerized styrene monomer and about 5 to 30 weight percent polymerized butadiene monomer. Suitable resinous branched block copolymers containing about 70 to 95 weight percent polymerized styrene monomer and about 5 to 30 weight percent polymerized butadiene monomer are described in U.S. Pat. No. 3,639,517 to Kitchen et al. and sold by Phillips 66 Company under the trademark "K-RESIN ® POLYMERS".

The minute fractures are formed in the layer of material by relaxing the surface(s) of the plastic member after the layer of material is coated thereon. The fractures are formed when the surface or surfaces of the plastic member are relaxed as a result of the layer of material being more rigid than the plastic member. It is possible for fractures to be formed in the layer of material naturally, i.e., without relaxing the surface(s) of the plastic member. In order to achieve the highest iridescent quality possible, however, it is generally desirable to carry out the relaxation step.

Any means can be used to relax the surface(s) of the plastic member. Preferably, the surface or surfaces of the plastic member are relaxed by applying heat thereto. The heat is preferably applied to the surface(s) of the plastic member at an intensity and for a period of time sufficient to relax the surface(s) without substantially distorting or degrading the plastic member. An oxidizing flame is preferably used to apply the heat. Reducing flames can also be used.

Figure 3:
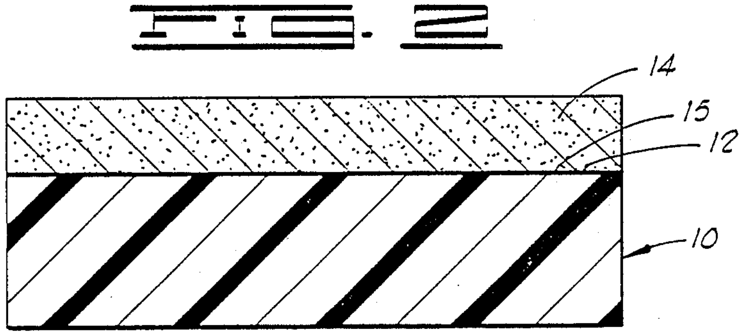
FIG. 3 is an enlarged end view of an article of manufacture as it may exist during an intermediate stage of a process of the present invention.

FIG. 3 is an enlarged end view of a plastic sheet 10 having a surface 12 coated with a layer of material 14 before the surface is relaxed. The layer of material does not have a plurality of fractures formed therein. FIG. 2 shows the plastic sheet after the surface 12 has been relaxed. A plurality of fractures 16 are formed in the layer of material 14 whereby light is reflected from the fractures at various wavelengths to cause the surface to display an array of lustrous colors.

The following example further describes the invention:

EXAMPLE 1

The process of the present invention was used to form iridescent sheets of plastic.

First, one surface of a 6×4×0.25 inch sheet of plastic was coated with a layer of material consisting essentially of silicon oxide (SiO). The sheet of plastic was formed of a resinous branched block copolymer containing about 70 to 95 weight percent polymerized styrene monomer and about 5 to 30 weight percent polymerized butadiene monomer. The copolymer is described in U.S. Pat. No. 3,639,517 to Kitchen et al. and sold by Phillips 66 Company under the trademark "K-RESIN ® POLYMERS". The layer of material was coated onto the surface of the sheet of plastic by vacuum deposition, i.e., by vaporizing solid silicon oxide inside a high vacuum chamber and causing it to condense on the surface. The layer of material was in the range of from about 3 micrometers to about 50 micrometers thick.

Next, the surface of the sheet of plastic having the layer of material adhered thereto was relaxed by applying heat thereto. An oxidizing flame was used to apply the heat in an amount sufficient to expand the surface of the sheet of plastic without melting or warping the same. As the surface was relaxed, a plurality of minute fractures formed in the layer of material adhered thereto.

The above steps were repeated using a second 6×4×0.25 inch sheet of sheet. The second sheet of plastic was formed of the same copolymer that formed the first sheet of plastic. This time, the layer of material coated onto the surface of the sheet of plastic consisted essentially of magnesium fluoride ($MgF_2$).

Both of the sheets of plastic formed have an iridescent quality. The fractures formed in the layers of material reflect light at various wavelengths to cause the surfaces of the plastic sheets to display an array of lustrous colors.

Thus, the process of the present invention can be used to form iridescent plastics or to impart an iridescent quality to a plastic member.

The preceeding example can be repeated with similar success by substituting the generically or specifically described reactants and/or operating conditions of this invention for those used in the example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. As an article of manufacture, an iridescent plastic member comprising:

at least one surface having a layer of material comprising at least one compound selected from the group consisting of silicon oxide and magnesium fluoride adhered thereto, said layer of material having a multiplicity of minute fractures formed therein that reflect light at various wavelengths to cause said surface to display an array of lustrous colors.

2. The article of claim 1 wherein said plastic member is formed of a copolymer of a conjugated diene and a monovinyl substituted aromatic hydrocarbon.

3. The article of claim 2 wherein said plastic member is formed of a styrene/butadiene copolymer.

4. The article of claim 3 wherein said plastic member is formed of a resinous branched block copolymer containing about 70 to 95 weight percent polymerized styrene monomer and about 5 to 30 weight percent polymerized butadiene monomer.

5. The article of claim 1 wherein said layer of material is in the range of from about 1 micrometer to about 50 micrometers thick.

6. The article of claim 1 wherein said layer of material consists essentially of silicon oxide.

7. The article of claim 1 wherein said layer of material consists essentially of magnesium fluoride.

* * * * *